United States Patent
van der Lely

[11] 3,711,959
[45] Jan. 23, 1973

[54] CROP DRYING SYSTEMS

[76] Inventor: Cornelis van der Lely, 7 Bruschenrain, Zug, Switzerland

[22] Filed: June 19, 1970

[21] Appl. No.: 47,258

[30] Foreign Application Priority Data

June 19, 1969 Netherlands ..................6909348

[52] U.S. Cl. ...................34/102, 34/189, 34/207, 34/236
[51] Int. Cl. ..................................................F26b 19/00
[58] Field of Search........34/102, 189, 190, 203, 207, 34/218; 130/22 R, 22 A; 198/195; 56/14.3, 14.5

[56] References Cited

UNITED STATES PATENTS

| | | | |
|---|---|---|---|
| 170,469 | 11/1875 | Chapin | 34/203 |
| 312,341 | 2/1885 | Duryea | 34/203 X |
| 936,947 | 10/1909 | Roth | 34/203 |
| 999,706 | 8/1911 | Eichler | 34/203 X |
| 1,176,685 | 3/1916 | Meakin | 34/203 X |
| 1,678,711 | 7/1928 | Shipman | 34/93 X |
| 2,228,192 | 1/1941 | Arthur | 34/203 X |
| 2,507,756 | 5/1950 | Boylan | 74/112 |
| 2,657,032 | 10/1953 | Tomlinson | 34/203 X |
| 2,763,119 | 9/1956 | Helfeld | 198/10 X |
| 3,367,038 | 2/1968 | Bishop | 34/52 X |
| 3,446,347 | 5/1969 | French et al. | 130/22 R |

FOREIGN PATENTS OR APPLICATIONS 631,422  11/1949  Great Britain........................198/195

*Primary Examiner*—Frederick L. Matteson
*Assistant Examiner*—Harry B. Ramey
*Attorney*—Mason, Mason & Albright

[57] ABSTRACT

A large capacity crop drier has an elongated chamber which may include transparent wall and roof partitions to admit solar radiations. A feeding device which may include a doser conveys crop to be dried into the chamber where it is chopped by retractable knives and carried back and forth through the chamber on superimposed endless belts starting at the top. The lower belt discharges back into the feeding device via a one-way conveyor closing the path of the drying crop. Air which may be heated is introduced into the chamber under the lowest belt opposite the feeding device and is exhausted on the same side that it was introduced or over walls under a raised roof. When desired by movement of a rear flap which may carry a conveying belt, the drier crop is discharged from the chamber via the flap to a blower conveyor. In a modification, the chamber has a moving belt floor, a blower which displaces air to under the floor and up through the chamber, and a mechanism for stirring crop in the chamber which automatically rides back and forth on tracks provided in the chamber.

22 Claims, 12 Drawing Figures

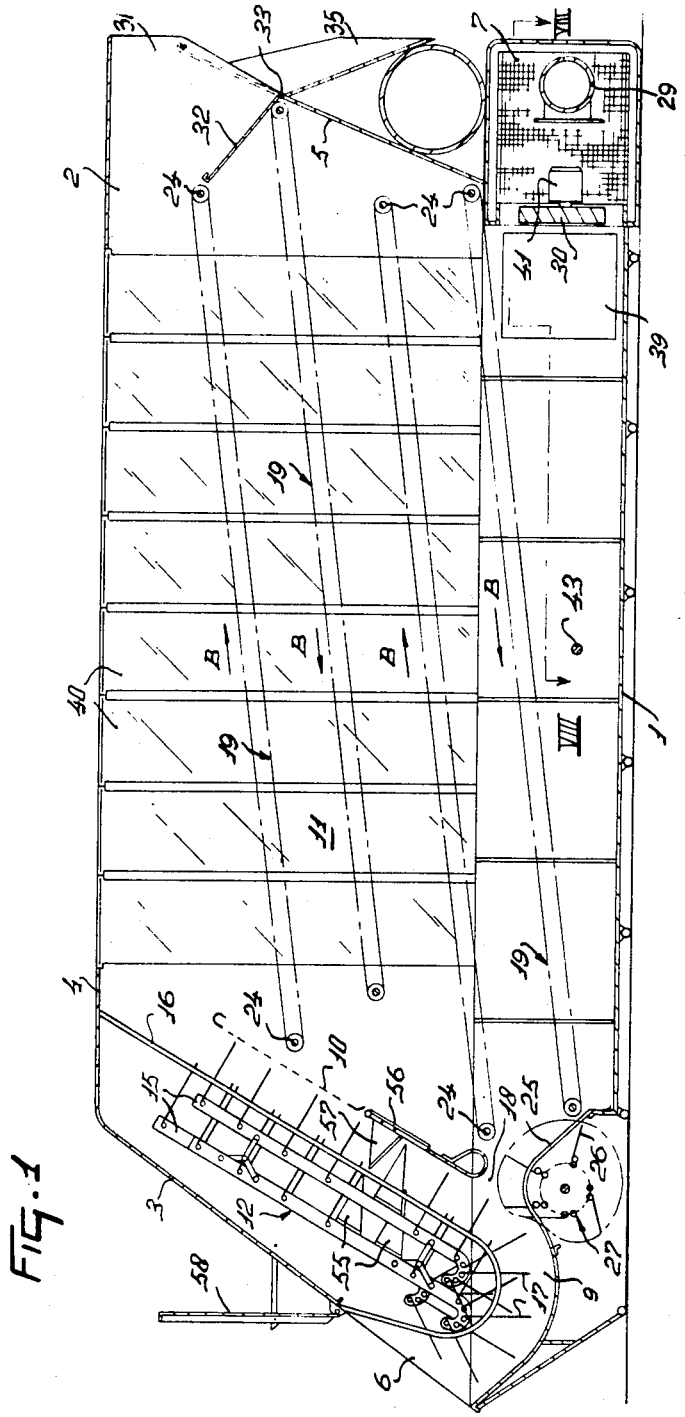

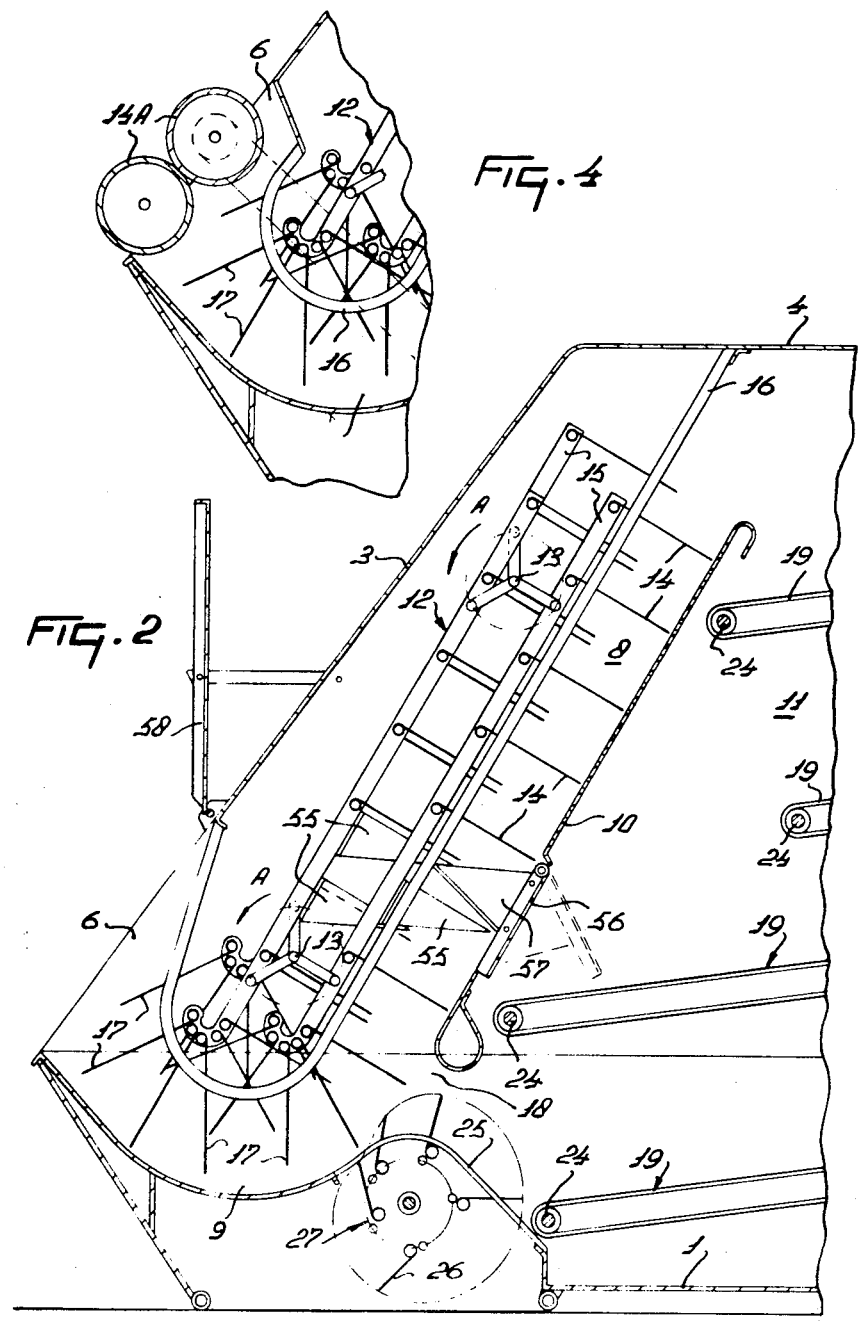

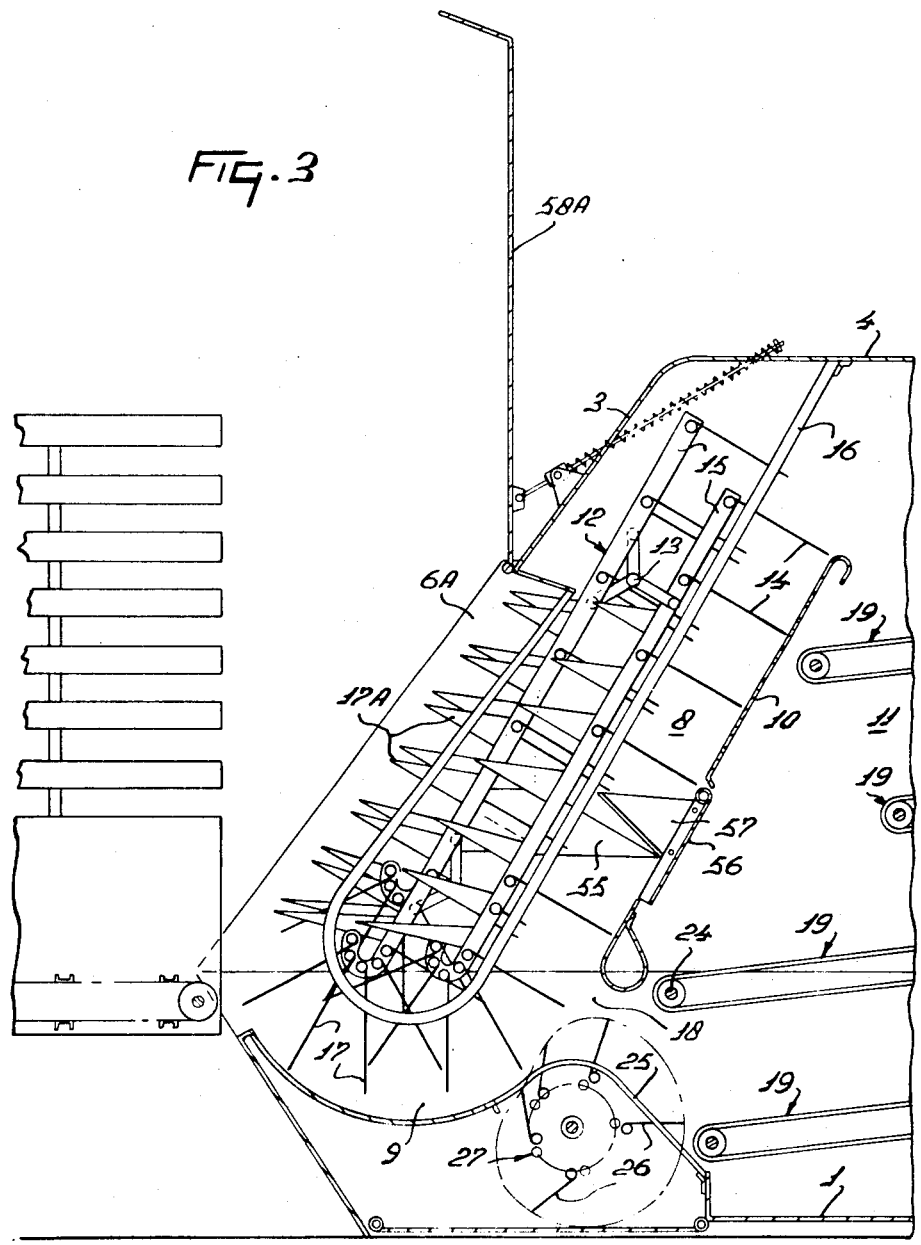

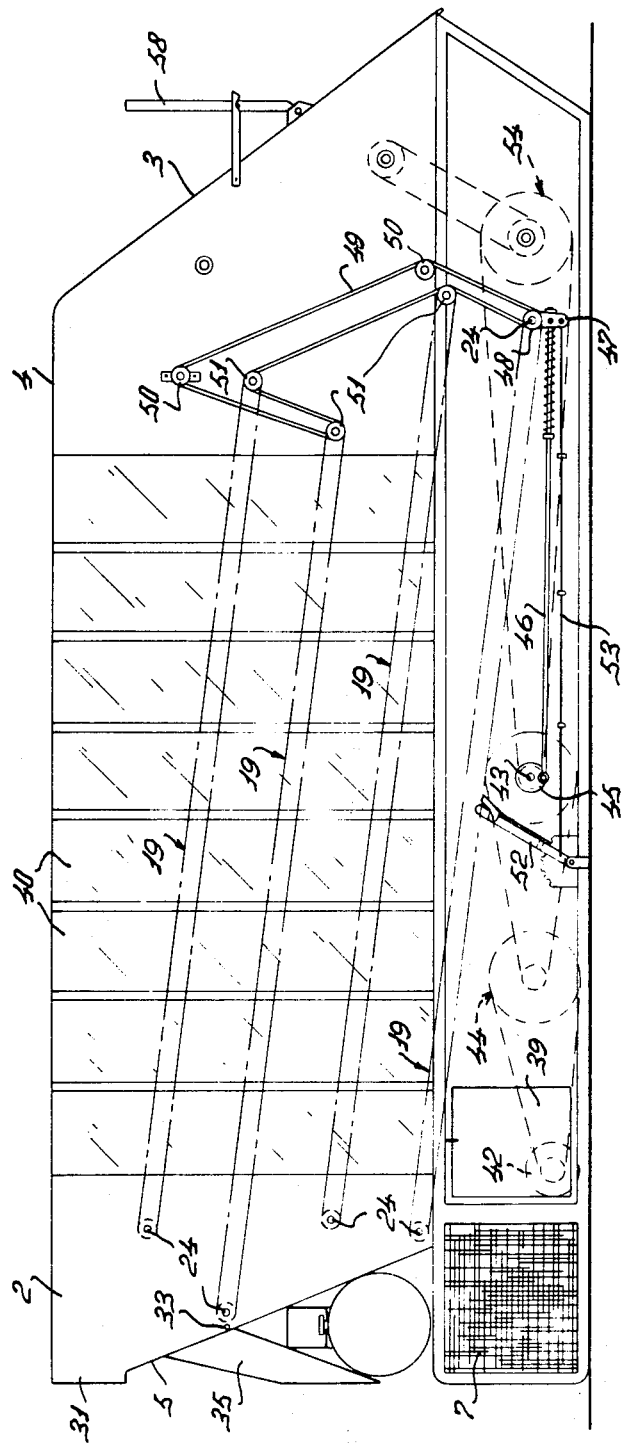

3,711,959

CROP DRYING SYSTEMS

SUMMARY OF THE INVENTION

This invention relates to crop drying systems of the kind comprising members for conveying crop received from a transport vehicle through a drying chamber.

Known systems of the kind mentioned above do not have sufficient capacity to enable them to hold a full load of crop from a conventional transport vehicle and this involves both delay in drying and increased drying costs. An object of the invention is to avoid or reduce this disadvantage of known systems.

According to one aspect of the invention, there is provided a drying system of the kind set forth, wherein heating apparatus is provided to enable air which may be at a raised temperature compared with that of the atmosphere to be fed to crop to be dried, and wherein the conveying members are constructed and arranged in such a way that a quantity of crop can be maintained in continuous circulation through a path which may be closed in the drying chamber during a drying operation.

For a better understanding of the invention, and to show how the same may be carried into effect, reference will now be made, by way of example, to the accompanying drawings, in which:

BRIEF DESCRIPTION OF THE DRAWINGS

FIG. 1 is a sectional side elevation of a crop drying system in accordance with the invention, FIG. 2 is an enlarged view showing a crop-receiving and other regions of the system in greater detail, FIG. 3 corresponds to FIG. 2 but illustrates an alternative construction, FIG. 4 corresponds to FIGS. 2 and 3 but illustrates a still further alternative construction, FIG. 5 corresponds to FIG. 1 but is a diametrically opposite view illustrating the drive transmission to endless conveyors of the system.

DESCRIPTION OF THE PREFERRED EMBODIMENTS

Figure 6:
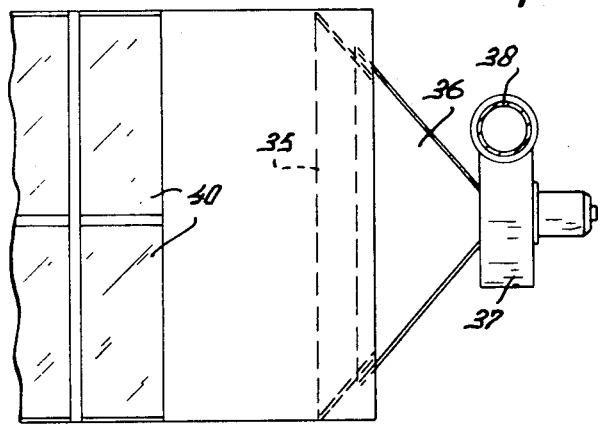
FIG. 6 is a plan view illustrating the crop discharge region of the system.

Referring firstly to FIGS. 1 and 2 of the drawings, the drying system which is illustrated takes the form of a superstructure having an elongated rectangular ground plate 1 to which substantially vertical side walls 2 are connected. The side walls 2 are interconnected by inclined front and rear walls 3 and 5, respectively, and a substantially horizontal roof 4. The front wall 3 is formed with an inlet opening 6 for the crop which is to be dried, said inlet opening 6 extending throughout the width of the superstructure which width conveniently has a magnitude of 250 centimeters. A space 7 is provided beneath the inclined rear wall 5 of the superstructure to accommodate parts of the system which supply the heating and drying gas during the use of that system. These parts will be described below.

The inlet opening 6 communicates with a feeding channel 8 a lower curved portion 9 of which leads to an upwardly and rearwardly inclined substantially straight portion 10 whose uppermost end communicates with the interior of a large drying chamber 11. It can be seen from the drawings that a feeding conveyor 12 is provided throughout substantially the whole of the width of the superstructure to move received crop through the feeding channel 8 to the drying chamber 11. The feeding conveyor 12 includes a plurality of feeding members 15 that are spaced apart from one another laterally of the superstructure. The feeding members 15 are rotatably connected to the crank pins of upper and lower crank shafts 13 which crank shafts have their crank pins offset from one another at 120° intervals around the axes of rotation of the crank shafts. Successive feeding members 15 are connected to the successively offset crank pins of the upper and lower crank shafts 13 and each member 15 carries a row of resilient tines 14 which project through gaps between a plurality of parallel strips 16 that afford the upper wall of the feeding channel 8. The lowermost and foremost ends of the feeding members 15 take the form of tightly curved portions each provided with a plurality, such as five, of resilient tines 17 which extend substantially radially with respect to the center of curvature of the curved portion concerned. The tines 17 also project through the gaps between the strips 16.

During the operation of the feeding conveyor 12, the crank shafts 13 rotate in the direction indicated by the arrows A in FIG. 2 of the drawings and it will be evident that the tines 14 and 17 are thereby caused to move through the portions 10 and 9 respectively of the feeding channel 8 in such a direction as to move crop contained therein towards the end of the channel 8 that opens into the drying chamber 11. As the tines 14 and 17 pass through portions of their paths of movement that would tend to move the crop in an opposite direction through the channel 8, they are withdrawn between the strips 16 to an extent such that they become substantially ineffective. When each feeding member 15 reaches its point of closest proximity to the strips 16, the tines 14 that are carried thereby have their tips very close to, or in contact with, the perforated rear wall of the straight portion 10 of the channel 8. The tines 17 also move very close to, or in contact with, the lower wall of the curved portion 9 as they project into that portion to a maximum extent. It will be noted that an opening 18 is formed in the lower wall of the feeding channel 8 at approximately the point at which the lower curved portion thereof merges into the straight portion thereof. This opening 18 establishes a connection with a leading lower region of the drying chamber 11.

Figure 9:
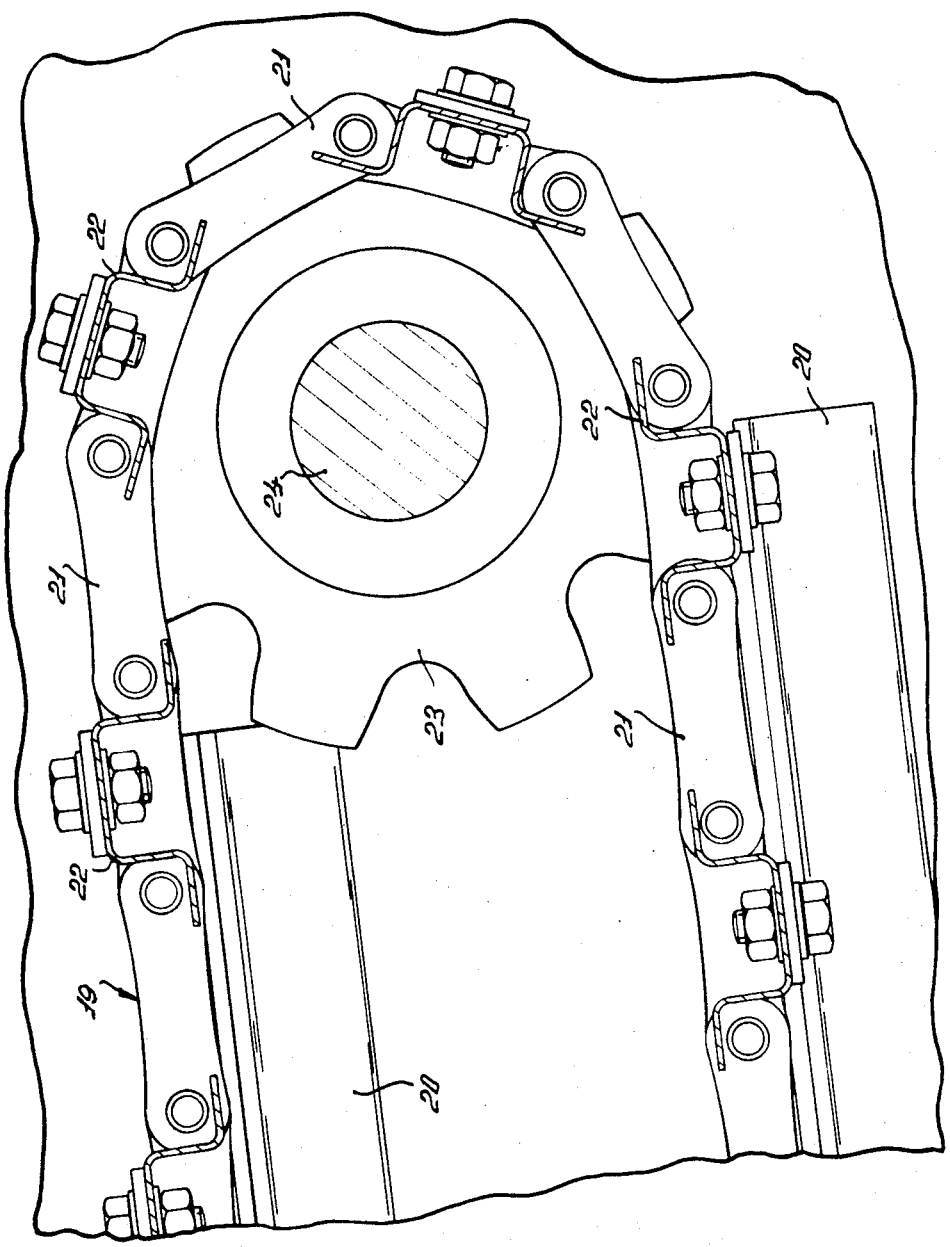
FIG. 9 is a sectional side elevation, to an enlarged scale, illustrating the construction of one of the endless conveyors of the system and the rotary support thereof.

The drying chamber 11 accommodates four endless conveyors 19 arranged one above the other in relatively parallel relationship. Each conveyor 19 includes two chains 21 (FIG. 9) that are spaced apart from one another laterally of the superstructure. The upper and lower runs of the chains 21 move over rollers (not shown) supported from guides 20 carried by the opposite side walls 2 of the superstructure. Crop-engaging beams or catches 22 perpendicularly interconnect the two chains 21 of each conveyor 19 at regular short intervals, each beam or catch 22 having a channel-shaped cross-section with the free ends (in cross-section) of the limbs of the channel bent over outwardly so as to be contained in a plane parallel to, but spaced from, the plane containing the base of the channel. The chains 21 pass around toothed pinions 23 carried by stub shafts 24 connected to the side walls 2 and it can be seen from FIG. 9 of the drawings that the arrangement of the beams or catches 22 is such that the base of each of them is radially outermost with respect to the axes of rotation afforded by the shafts 24 so that said bases are uppermost as the beams or catches 22 move through the upper runs of the various conveyors 19.

The opening 18 (FIGS. 1 and 2) is located at approximately the level of those ends of the two lowermost conveyors 19 that are closest to the inlet opening 6. The curved lower wall of the lower portion 9 of the feeding channel 8 terminates in an oppositely curved portion 25 whose rearmost part is inclined rearwardly and downwardly towards the ground plate 1. A drum 27 is rotatably mounted beneath the curved portion 25 and is provided with a plurality of resilient tines 26 that project through slots in the curved portion 25 during passage through upper parts of their paths of movement around the axis of rotation of the drum 27. The drum 27 rotates in a counterclockwise direction as seen in FIGS. 1 and 2 of the drawings and it will therefore be evident that the tips of the tines 26 follow approximately the broken-line path illustrated in FIG. 2 of the drawings which path passes upwardly from the foremost end of the lowermost conveyor 19 through the center of the opening 18 and then steeply downwards to meet the curved portion 25 at its junction with the lower wall of the curved portion 9 of the feeding channel 8. It will be realized that the resilient deflection of the tines 26 that causes the non-uniform shape of the path illustrated in FIG. 2 is the result of those tines meeting the ends of the slots through the curved portion 25 as the drum 27 rotates.

Figure 8:
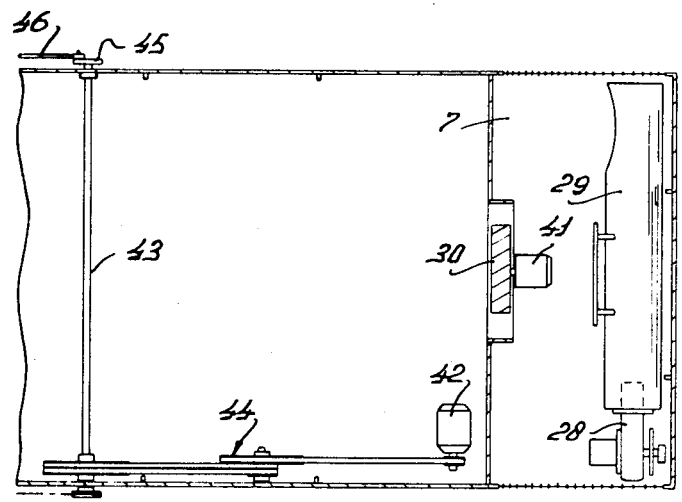
FIG. 8 is a section taken on the line VIII—VIII of FIG. 1.

The space 7 beneath the rear wall 5 of the superstructure contains a burner 28 (FIG. 8) whose delivery mouth opens into a combustion chamber 29 that extends horizontally transverse to the length of the superstructure. The combustion chamber 29 has an outlet towards the end thereof which is remote from the burner 28 and said outlet faces forwardly towards the drying chamber 11 as can be seen in FIGS. 1 and 8 of the drawings. A blower 30 is mounted in the leading wall of the space 7 so as to communicate with the drying chamber 11 and the burner 28 is preferably rated between 25,000 and 100,000 kcal. per hour so that the atmospheric air in the space 7 is not heated excessively before the blower 30 passes it substantially horizontally into a lower region of the drying chamber 11. The burner 28 is preferably, but not essentially, operated by liquid fuel from a cylindrical tank located immediately above the upper wall of the space 7. The air and combustion gases that are introduced into the drying chamber 11 by the blower 30 can leave that chamber by way of an outlet opening 31 formed in an upper region of the rear wall 5 of the superstructure.

Crop dried in the chamber 11 can be discharged therefrom by moving over a flap 32 (FIG. 1) that is turnable about a horizontal shaft 33 extending perpendicular to the side walls 2 between the operative position illustrates in full lines in FIG. 1 and an inoperative position that is shown in broken lines in the same Figure. The flap 32 extends throughout substantially the whole of the width of the superstructure and its lowermost edge communicates with a funnel-shaped chute 35 that is intended to co-operate, during crop discharge, with a funnel-shaped inlet 36 (FIGS. 6 and 7) of a blower-conveyor 37 that is positioned behind the system with its delivery duct 38 leading to a neighboring crop store, treatment apparatus or other transport mechanism (not shown).

If desired, the tines 17 (FIG. 2) at the foot of the feeding conveyor 12 may be arranged so that some of them project repeatedly from the inlet opening 6 in such a way as to drag crop presented to that opening into the lower curved portion 9 of the feeding channel 8. This enables wet crop to be unloaded from a wagon, trailer or other transport vehicle without the aid of any auxiliary mechanical apparatus. FIG. 3 of the drawings illustrates an alternative construction of the feeding conveyor 12 in which knife-edged teeth 17A project forwardly from the feeding members 15 through the gaps between the strips 16. An inlet opening 6A of larger size than the previously described inlet opening 6 is provided and it can be seen from FIG. 3 of the drawings how the conveyor floor of a wagon or trailer can co-operate with the system to move a load of crop rearwardly into the inlet opening 6A in which opening knife-edged teeth 17A perform repeated downward movements in the same manner as the tines 14 perform repeated upward movements in the portion 10 of the feeding channel 8. The knife-edged teeth 17A afford a dosing mechanism for the introduction of wet or damp crop into the feeding channel 8. A large pivotally mounted flap 58A is provided in the construction illustrated in FIG. 3 of the drawings and it will be evident from that Figure that said flap can be turned downwardly from the illustrated raised position to a position in which it closes the inlet opening 6A. At least one helical compression spring is provided to assist in raising the flap 58A from its closed position to its illustrated open position.

FIG. 4 of the drawings illustrates a further alternative arrangement in which a pair of co-operating rollers 14A are arranged at the mouth of the inlet opening 6 so that crop to be introduced into the feeding channel 8 must pass between the two rollers 14A. This construction is particularly useful when the crop to be dealt with is advantageously crushed before drying to effect the release of sap or other moisture, and the two rollers 14A once again afford a dosing mechanism for introducing crop into the lower curved portion 9 of the feeding channel 8, the dosing mechanism operating with a crushing action. A flap corresponding to the flap 58A of FIG. 3 is not employed in the construction shown in FIG. 4.

Figure 10:
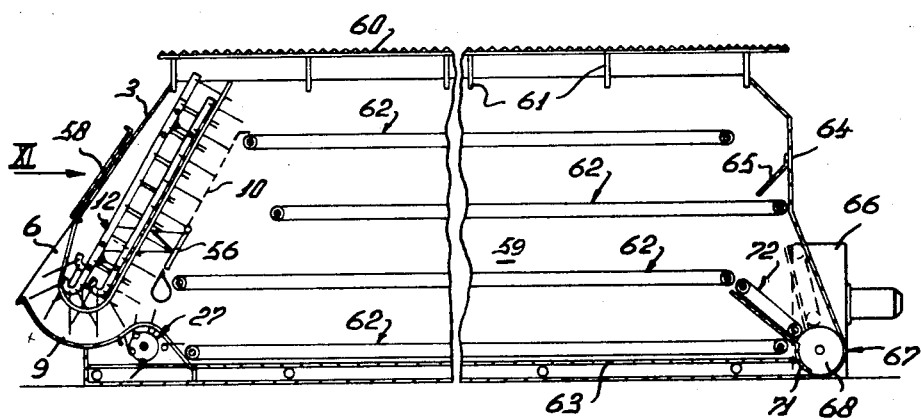
FIG. 10 is a side elevation corresponding to FIG. 1 but to a reduced scale illustrating an alternative form of crop drying system in accordance with the invention.
Figure 11:
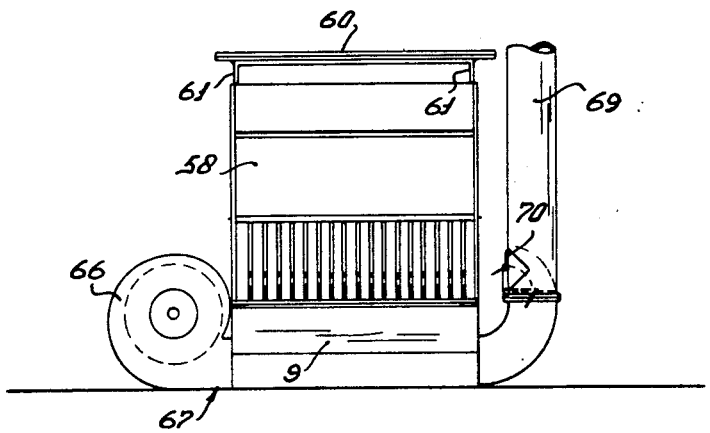
FIG. 11 is a front elevation of the system of FIG. 10 as seen in the direction indicated by an arrow XI in FIG. 10, and FIG. 12 corresponds to FIG. 10 but illustrates a further alternative system in accordance with the invention which incorporates displaceable discharging or dosing mechanism.

FIGS. 10 and 11 of the drawings illustrate an alternative form of drying system in accordance with the invention which drying system, although basically similar to the system that has already been described, has a drying chamber 59 of greater length than the drying chamber 11. The superstructure has a roof 60 that is spaced above the upper edges of the walls thereof by a plurality of supports 61. The roof 60 overlaps the walls of the superstructure to some extent and is preferably formed from a heat and/or light permeable material so that solar heat may assist in the drying operation. The roof 60 may, as illustrated, be of a corrugated formation. Due to the space between the uppermost edges of the walls of the superstructure and the roof 60, drying air and combustion gases can escape from beneath the roof 60 so that an outlet opening corresponding to the opening 31 is not required. There are four relatively parallel and vertically spaced apart superimposed endless conveyors 62 which conveyors may be identical in construction to that of the conveyors 19, this construction being shown in detail in FIG. 9 of the drawings. However, in this case, the endless conveyors 62 are substantially horizontally disposed in contrast to the conveyors 19 which are gently inclined to the horizontal. The lowermost conveyor 62 is located immediately above a floor plate 63 of the superstructure and crop to be dried is fed into the chamber 59 in any one of the ways that have previously been described with reference to FIGS. 1 to 9 of the drawings. Accordingly, the construction shown in FIG. 1 is also shown in FIGS. 10 and 11 and the same reference numerals are employed as appear in FIG. 1.

Figure 7:
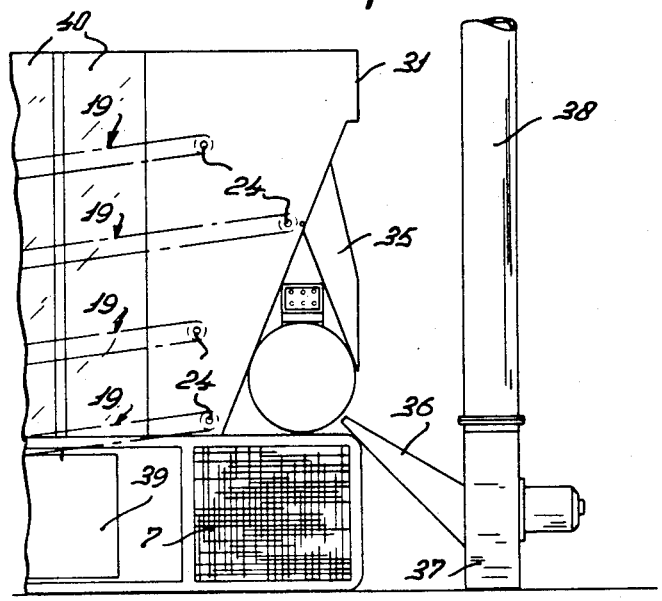
FIG. 7 is a side elevation corresponding to FIG. 6.

The chamber 59 has a rear wall 64 which is provided, immediately above the conveyor 62 that is beneath the uppermost conveyor, with an inclined guide 65 arranged to direct the crop from the uppermost conveyor 62 without difficulty onto the underlying conveyor. A blower 66 is arranged at one side of a rear region of the superstructure (see FIG. 11) and this blower has an outlet channel 67 that extends horizontally perpendicular to the length of the superstructure to communicate with the interior of the chamber 59 by way of a duct or channel portion 68. The duct 68 communicates with an upwardly directed delivery duct 69 in which a closing flap 70 (FIG. 11) is pivotally mounted adjacent its lower end. The duct or channel portion 68 that is located inside the drying system is provided with a cylindrically curved closing flap 71 which also carries the support of a short endless conveyor 72. As can be seen in FIG. 10 of the drawings, the flap 71 and conveyor 72 can be turned about an axis corresponding with the longitudinal axis of the duct or channel portion 68 between two positions which are shown in full and broken lines respectively in regard to the conveyor 72. In the broken line position, the air supplied by the blower 66 is blown into a lower region of the drying chamber 59 whereas, when the full line position of the conveyor 72 is employed and the closing flap 70 is opened, the conveyor 72 delivers crop into the duct or channel portion 68 of the outlet channel 67 and the blower 66 operates as a blower conveyor to feed the crop into the delivery duct 69 which duct corresponds to the previously described duct 38 (FIGS. 6 and 7). The conveyor 72 receives crop from the third (counting from top to bottom) of the endless conveyors 62 and it will be apparent that the blower 66 can be used both for drying and subsequent delivery purposes.

The complete load of a fully loaded wagon, trailer, lorry or other crop-transport vehicle of conventional size can be accommodated in the drying chamber 59 at one time and this is, of course, also true of the drying chamber 11 in the previously described embodiment. The complete load of crop can accordingly be circulated through the system for drying purposes for as long a period of time as is required. No burner or other heating apparatus is employed in the system shown in FIGS. 10 and 11 of the drawings but it will be realized that, if required, a burner or other heater could readily be introduced to raise the temperature of the drying air fed to the chamber 59 by the blower 66. A liquid-fuelled burner similar to the burner 28 that has already been described could be introduced into the system of FIGS. 10 and 11 of the drawings with but little modification. As previously mentioned, solar heat permeates the roof 60 to assist in the drying operation when the weather is favorable. A pivotally mounted flap 58 is provided to close the inlet opening 6 during continuous drying operations in both the system of FIG. 1 and the system of FIG. 10 of the drawings.

Inspection blinds 39 (FIGS. 1 and 5) are provided in the side walls 2 of the superstructure of the drying system of FIGS. 1 to 9 of the drawings so that the drive transmission to the conveyors 19 can be inspected when required. Upper portions of the side walls 2 located above the level of the space 7 and the blinds 39 are preferably formed from a material that is permeable to heat and light. This material may be glass or a transparent synthetic plastics material and the side walls 2 are formed from sections 40 of this material which sections are in line with corresponding sections of the roof 4 that are formed from the same material. An electric motor 41 drives the blower 30 and also the impeller of the burner 28. The conveyors 19 are driven from a separate electric motor 42 (FIGS. 5 and 8) through the intermediary of a driving shaft 43 that extends horizontally between the side walls 2 in a direction perpendicular to the planes of those side walls. A disc 45 carrying an eccentric pin is secured to one end of the driving shaft 43 and a connecting rod 46 links the eccentric pin with a pawl 47 (FIG. 5) carried by one of the stub shafts 24 at the leading end of the lowermost conveyor 19. A pulley 48 is also secured to this stub shaft 24 and this pulley drives an endless V-belt, band, rope or the like 49 that passes around pulleys 51 secured to stub shafts 24 at the leading ends of the other three conveyors 19 and also around two guide pulleys 50 rotatably connected to one of the side walls 2.

The pawl 47 is arranged to drive a ratchet wheel carried by the stub shaft 24 to which said pawl is rotatably connected and the amplitude of the oscillation of the pawl 47 which is produced in response to the movement of the connecting rod 46 can be adjusted by means of a lever 52 which is linked to said pawl 47 by a control cable 53. The connecting rod 46 drives the pawl 47 through the intermediary of a spring and the lever 52 can be moved as required between a position in which all of the movement of the connecting rod 46 is utilized and a position in which all of that movement is lost and has no driving effect upon the pawl 47. Intermediate positions of the lever 52 correspond to faster or slower driving speeds for the conveyors 19.

The width of the inlet opening 6 of the system substantially corresponds to the conventional width of wagons, trailers, lorries and other vehicles that are used for the collection and/or transport of crop and such a vehicle can discharge the whole of its load progressively into the inlet opening 6. The rotation of the crank shafts 13 in the direction A causes the tines 14 and 17 of the feeding members 15 to move the received crop upwardly along the lower and rear walls of the two feeding channel portions 9 and 10 into the drying chamber 11. The tines 26 of the drum 27 prevent crop from passing through the opening 18 into a lower region of the drying chamber 11. In addition to the tines 14, each feeding member 15 carries at least one knife 55 and these knives 55 co-operate with a row of knives 57 carried by a support 56 that can be pivoted inwardly of the drying chamber 11 to the position shown in broken lines in FIG. 2 of the drawings. When, as will often be the case, the collected crop is long-stalked crop, the co-operating knives 55 and 57 cut this crop into smaller pieces before it reaches the drying chamber 11 so that a more uniform distribution thereof on the conveyors 19 results.

The air that is introduced into the chamber 11 by the blower 30 has been slightly heated by the burner 28 and some of it passes through the opening 18 and other perforations into the feeding channel 8 so that a certain amount of drying takes place even before the crop is first introduced into the chamber 11. Once crop has reached the top of the feeding channel 8, it drops a short distance onto the leading end of the upper run of the uppermost conveyor 19, the crop then being slowly transported to and fro along the successive conveyors in the directions indicated by the arrows B in FIG. 1 of the drawings. The drying air and combustion gases pass over and through the crop during this movement so that an intimate drying contact therebetween is obtained. The flap 32 will occupy the position thereof that is shown in broken lines in FIG. 1 of the drawings during the drying operation so that the delivery chute 35 remains ineffective. It will be realized that, once crop has fallen onto the lowermost conveyor 19, it will be moved therealong in the direction B until it comes close to the opening 18 at which point it is engaged by the tines 26 and pushed through that opening. The tines 14 then elevate the crop again through the straight portion 10 of the feeding channel 8 for recirculation through the system. A quantity of crop within the system can, in this way, be kept in motion under the action of drying air and combustion gases for as long a period as is desired. The system is sufficiently large to deal with the whole load from a fully loaded wagon, trailer, lorry or other crop transport vehicle of conventional size and the system can be left operating for as long as is required to complete the drying of such a load. When the crop has been sufficiently chopped up, the support 56 and its knives 57 can be moved to the broken line position thereof that is shown in FIG. 2 of the drawings to prevent any further appreciable chopping action. The fuel consumption need not be great despite the long period of drying time which is possible because the burner 28 produces only gently heated drying air and it is, of course, possible to extinguish the burner 28 and rely upon the natural drying action of unsaturated atmospheric air during all, or part, of the drying of a load of crop. The flap 58 is maintained closed during a prolonged drying operation and it will be apparent that such an operation can continue without hindrance even during heavy rain. It is not vital that the crop should be discharged from the system at any particular instant because the use of low temperature drying gas prevents overheating, scorching and the like.

A drying operation can be carried out twice a day and it is, for example, possible to supply a wagon or trailer load of crop to the system in the morning and to dry that load continuously until the afternoon. The crop can then be discharged and replaced by a further complete load from a wagon, trailer, truck, lorry or other vehicle. Dosing mechanism other than that previously described may be employed in introducing crop from a transport vehicle into the inlet opening of the system. A drying operation can, if required, continue for a period as long as 24 hours. The operator of the system can load the drying chamber once a day in the knowledge that the crop will be discharged 24 hours later in a completely dry condition irrespective of the prevailing weather conditions and without incurring very much trouble or cost. Crop is discharged from the chamber 11 by moving the flap 32 into the position shown in full lines in FIG. 1 of the drawings so that crop which reaches the rear end of the uppermost conveyor 19 is deflected over the flap 32 into the chute 35 and thence to the inlet 36 of the blower conveyor 37 (FIGS. 6 and 7). In the previously described first transmission from the electric motor 42 to the endless conveyors 19, a first speed-reduction assembly 44 (FIGS. 5 and 8) is rotatably connected to one of the side walls 2 of the superstructure and comprises interconnected pulleys of dissimilar sizes co-operating with V-belts, bands, ropes or the like. A pulley or sprocket wheel is secured to the end of the driving shaft 43 remote from the disc 45 that carries the eccentric pin and a V-belt, band, rope or the like or, alternatively, a transmission chain, transmits drive from this pulley or sprocket wheel to a larger pulley or sprocket wheel forming part of a second speed-reduction assembly 54 (FIG. 5). It will be evident from FIGS. 1 and 5 of the drawings that the assembly 54 rotates the drum 27 and also transmits rotation, at a reduced speed, to the lower one of the two crank shafts 13 of the feeding conveyor 12. The transmission parts which have just been described are illustrated only in outline in the drawings.

Figure 12:
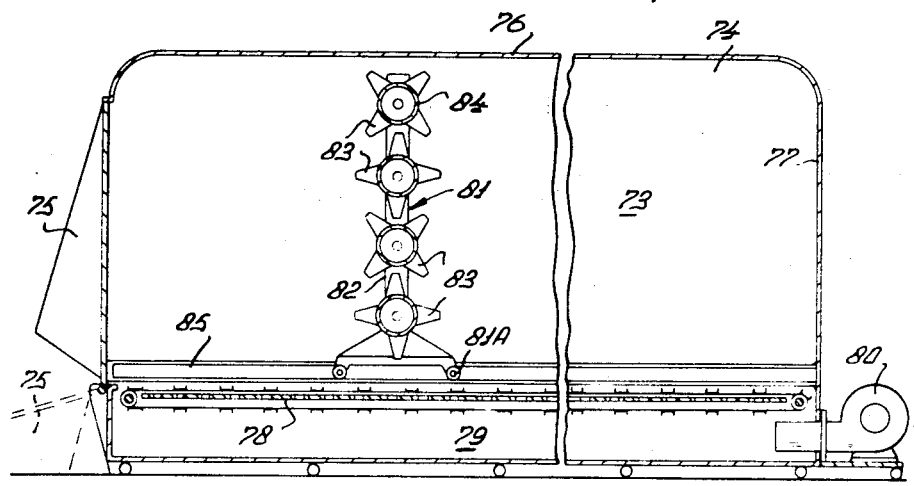

FIG. 12 of the drawings illustrates a drying system in which a drying chamber 73 can again receive a full load of crop from a fully loaded wagon, pick-up trailer, truck, lorry or other crop-transport vehicle. The chamber 73 has two substantially vertical side walls 74, a pivotally mounted front wall 75, a fixed roof 76 and a fixed rear wall 77. As can be seen in FIG. 12 of the drawings, the front wall 75 is pivotally mounted in such a way that it can be turned downwardly into the position shown in broken lines in that figure in which it affords a ramp leading upwardly from ground level to a floor 78 of the chamber 73. The floor 78 is afforded by the upper run of an endless conveyor of open construction that is movable over a fixed horizontal floor plate formed with a large number of air holes. It will be realized that a wagon, trailer or other vehicle can discharge its load of crop into the space 73 by moving rearwardly up the ramp afforded by the front wall 75 and emptying its crop directly onto the leading region of the endless conveyor of the floor 78. The upper run of the conveyor of that floor is then moved rearwardly until all of the load of crop is housed within the chamber 73. A space 79 is formed beneath the floor 78 and this space is fed with air, during operation of the system, by a blower 80 located at the rear end of the system. The blower 80 may be associated with a burner or other heating apparatus which may be similar to the burner 28 that has previously been described.

The chamber 73 accommodates a displaceable discharging or dosing mechanism 81 that is movable lengthwise through the chamber 73. The mechanism 81 includes a substantially vertical supporting structure 82 carrying four vertically spaced apart drums 84 that are rotatable about substantially coplanar horizontal axes extending perpendicular to the length of the chamber 73. Each drum 84 carries a plurality of teeth 83 at 90° intervals around its axis of rotation and, as can be seen in FIG. 12 of the drawings, the teeth 83 of each drum 84 are offset through approximately 45° with respect to those of the or each neighboring drum 84. The mechanism 81 is displaceable along rails 85 secured to the side walls 74 with the aid of small rollers 81A that co-operate with said rails. An electric motor (not shown) is provided for rotating the drums 84 and moving the mechanism 81 lengthwise along the rails 85 and an electrical or mechanical mechanism of known construction is preferably provided at the opposite ends of the chamber 73 to reverse automatically the direction of movement of the mechanism 81 along the rails 85.

When the chamber 73 is filled in the manner previously described, the mechanism 81 will be positioned alongside the rear wall 77 of said chamber. Subsequent to loading, the front wall 75 is placed in the position shown in full lines in FIG. 12 of the drawings and the blower 80 is operated to supply heated or unheated air to the interior of the chamber 73 through the apertured floor 78. Upper outlets (not shown) are provided for exhausting the heated air and any combustion gases that there may be to the atmosphere. The mechanism 81 is caused to move slowly to and fro through the chamber 73 during the supply of drying air and its drums 84 rotate so that their teeth 83 displace the crop between them with a combing and/or chopping action dependent upon the precise formation of the teeth 83. When the crop is fully dried, the mechanism 81 can be positioned at the left-hand end of the chamber 73 as shown in FIG. 12 of the drawings and its drums 84 can be rotated to discharge the crop slowly to a waiting conveyor, transport vehicle or the like. The endless conveyor of the floor 78 is operated to ensure that all the crop within the chamber 73 is fed to the mechanism 81 and it will be realized that said mechanism thus acts as a discharging or dosing mechanism. The system of FIG. 12 can thus be regarded either as a drying system incorporating a discharging or dosing mechanism or as a discharging or dosing mechanism which incorporates a drying system.

The conveying members of the drying systems that have been described with reference to FIGS. 1 to 11 of the drawings are such that the crop which they carry is subject to contact with drying air throughout substantially the whole of the length of each conveying member. The total length of the drying path should be as long as possible and it is preferred that this length should have a value of from 10 to 100 meters.

Having thus described my invention, what I claim as new and desire to secure by Letters Patent of the United States is:

1. A device for drying crop including cut grass or the like which comprises:
   a drying chamber which has a first space and second space which includes an internal opening for the passage of crop from said first space to said second space;
   drying means associated with said second space of said chamber, said drying means including a heating mechanism for producing heated air in said chamber and a blower means for introducing air into said second space;
   a first conveying means mounted in said second space of said chamber for moving the crop received therein through said heated air during the drying operation, said first conveying means including an endless conveyor disposed in the bottom part of said chamber;
   a second conveying means located in said first space of said chamber, said second conveying means adapted to convey crop fed thereto to said opening for passing crop from said first space to said second space;
   a third conveying means comprising a rotary tined member and a second internal opening in said chamber between said first and said second spaces through which said rotary tined member moves crop from said first conveying means in said second space to said second conveying means, said blower means producing a flow of heated air from said second space into said first space through said second opening whereby said rotary tined member cooperating with said first conveying means feeds crop in the direction of the air flow from said blower through said second opening to said second conveying means and the crop may be continuously circulated through heated air within said chamber by said three conveying means during the drying operation.

2. A device as claimed in claim 1, wherein the said rotary tined member is disposed near one end of said endless conveyor.

3. A device as claimed in claim 1, wherein said rotary tined member is afforded by a rotary drum which is provided with resilient tines.

4. A device as claimed in claim 1, wherein the said endless conveyor and said rotary tined member extend throughout substantially the whole of the width of the said chamber.

5. A device as claimed in claim 1, wherein said endless conveyor is inclined relative to the horizontal.

6. A device as claimed in claim 1, wherein said second conveying means comprises a feeding channel in said first space which discharges crop into the upper part of said chamber through said first mentioned opening.

7. A device as claimed in claim 6, wherein the said rotary member is arranged adjacent said second opening, said second opening interconnecting said second space of said chamber and the lower aspect of said feeding channel.

8. A device as claimed in claim 7, wherein the said second conveying means comprises crop-engaging tines which are arranged in said feeding channel, said feeding channel including a lower curved portion directly communicating with an inlet opening of the device, said lower curved portion connecting said inlet opening to a substantially straight portion of said feeding channel that extends upwardly and rearwardly away from said inlet opening.

9. A device as claimed in claim 8, wherein said second opening is formed in a wall of the feeding channel at or near the junction between said lower curved and straight portions thereof, said second opening being proximate the lowermost aspect of said feeding conveyor and also proximate one end of said endless conveyor located in said second chamber.

10. A device as claimed in claim 8, wherein a wall included in said straight portion of said feeding channel lies between said feeding channel and said second chamber, said wall having a plurality of openings through which drying air including other gases in said second chamber are receivable in said feeding channel.

11. A device as claimed in claim 8, comprising feeding members, at least one crank shaft, and crank pins, wherein said second conveying means includes a plurality of said feeding members connected side by side to said crank pins of said crank shaft, said feeding members having resilient tine members, the feeding members having at their lowermost ends curved portions which carry radial tines that extend substantially radially with respect to the center of curvature of said portions, said radial tines being arranged to extend into the lower curved portions of said feeding channel which directly communicates with said inlet opening.

12. A device as claimed in claim 1, wherein the said endless conveyor is afforded by at least two chains transversely interconnected at spaced intervals by crop-engaging means.

13. A device as claimed in claim 1, wherein said blower means is selectively adapted to supply drying air to said drying chamber or to convey dried crop from said chamber.

14. A device as claimed in claim 13, wherein the said blower means communicates with an outlet channel extending horizontally and perpendicular to the longitudinal axis of said chamber.

15. A device as claimed in claim 13, wherein a flap is movably arranged between a position in which air is supplied to said chamber for drying purposes and a position in which the supplied air generated by said blower may be entrained into unloading means.

16. A device as claimed in claim 1, wherein said blower means and said heating mechanism are arranged at one end of the device relatively opposite to said inlet opening for receiving crop therein to be dried.

17. A device as claimed in claim 1 including a burner in said heating mechanism rated at between 20,000 and 100,000 kcal. per hour.

18. A device as claimed in claim 1, wherein the roof of said drying chamber is composed at least in part of material adapted to be permeated by solar heat.

19. A device as claimed in claim 18, wherein the said material is a transparent synthetic plastic material.

20. A device as claimed in claim 1, wherein at least part of each side wall of said drying chamber is composed of material adapted to be permeated by solar heat.

21. A device as claimed in claim 1 which includes means for deflecting the tines of said rotary tined member to prevent said tines from engaging said second conveying means.

22. A device as claimed in claim 1 wherein said third conveying means is located at least in part in said second opening which includes means for retaining said tines of said rotary tined member in an upright portion in said second opening whereby when said second conveyor is stopped said upright tines substantially prevent the passage of crop through said second opening.

* * * * *